United States Patent [19]

Szymanski et al.

[11] Patent Number: 5,749,269
[45] Date of Patent: May 12, 1998

[54] DUAL-MODE, VISCOUS CRANKSHAFT VIBRATION DAMPER

[75] Inventors: John George Szymanski, Buffalo; Robert Henry Stanley, Jr., Niagara Falls; Fredrick Richard Roland, Hamburg, all of N.Y.

[73] Assignee: Vibratech, Inc., Alden, N.Y.

[21] Appl. No.: 638,177

[22] Filed: Apr. 26, 1996

[51] Int. Cl.[6] .................................................. F16F 15/10
[52] U.S. Cl. ........................................................ 74/574; 74/572
[58] Field of Search .............................. 74/573 F, 573 R, 74/574, 572

[56] References Cited

U.S. PATENT DOCUMENTS

| | | |
|---|---|---|
| 2,198,135 | 4/1940 | Strasburg et al. |
| 2,636,399 | 4/1953 | O'Connor |
| 2,724,983 | 11/1955 | O'Connor |
| 2,736,393 | 2/1956 | O'Connor |
| 3,462,136 | 8/1969 | Rumsey |
| 3,552,230 | 1/1971 | McLean |
| 3,603,172 | 9/1971 | Hall |
| 3,670,593 | 6/1972 | Troyer |
| 3,945,269 | 3/1976 | Bremer, Jr. |
| 4,295,546 | 10/1981 | Vollett |
| 4,339,963 | 7/1982 | Bremer, Jr. |
| 4,368,807 | 1/1983 | McLean et al. |
| 4,395,809 | 8/1983 | Whiteley |
| 4,734,079 | 3/1988 | Viets |
| 4,787,868 | 11/1988 | Hoshiba et al. |
| 4,825,718 | 5/1989 | Seifert et al. |
| 4,825,983 | 5/1989 | Nakanishi |
| 4,848,183 | 7/1989 | Ferguson |
| 4,873,888 | 10/1989 | Matsuyama |
| 4,895,047 | 1/1990 | George |
| 5,058,453 | 10/1991 | Graham et al. ............ 74/573 F X |
| 5,139,120 | 8/1992 | Gomi |
| 5,140,868 | 8/1992 | Mizuno et al. |
| 5,328,408 | 7/1994 | Wolf et al. |
| 5,352,157 | 10/1994 | Ochs et al. |
| 5,425,287 | 6/1995 | Beattie |

FOREIGN PATENT DOCUMENTS

| | | | |
|---|---|---|---|
| 90254 | 3/1971 | Germany | 74/573 F |
| 404054346 | 2/1992 | Japan | 74/573 F |
| 405060177 | 3/1993 | Japan | 74/573 F |
| 405157137 | 6/1993 | Japan | 74/573 F |

*Primary Examiner*—Charles A. Marmor
*Assistant Examiner*—Saúl J. Rodriguez
*Attorney, Agent, or Firm*—Hill & Simpson

[57] ABSTRACT

A viscous torsional vibration damper having an annular chamber surrounding a central hub and first and second annular inertia masses located within the annular chamber. The innermost first inertia mass is closely coupled with an inner surface of the working chamber, and has a Teflon bearing arranged between the first inertia mass and the inner surface. The second annular inertia mass is closely mechanically coupled with the first inertia mass by lateral damping units, such as by elastomeric O-rings, such that the combination of the first and second inertia masses and the damping units are substantially freely rotatable within the working chamber due to the Teflon bearing but are arranged to absorb lateral vibrations by the lateral dampers. A viscous fluid is disposed within the working chamber surrounding the inertia masses.

19 Claims, 2 Drawing Sheets

DUAL-MODE, VISCOUS CRANKSHAFT VIBRATION DAMPER

BACKGROUND OF THE INVENTION

The present invention relates to viscous vibration dampers and in particular to a dual-mode viscous crankshaft vibration damper which dampens both lateral and torsional vibration of a rotating shaft connected thereto. In a viscous torsional vibration damper, an annular inertia mass is held within an annular working chamber of a housing. The housing is connected at its axial center to a shaft to rotate with the shaft. A viscous fluid is disposed between and around the inertia mass within the working chamber. The housing and inertia mass are coupled by the viscous fluid to rotate together. The viscous fluid and inertia mass dampen torsional vibration transmitted through the shaft to the housing.

A problem present in the prior art has been to overcome unusual or critical vibration modes in the rotating shaft. To solve this problem, the dampers have been tuned to a particular vibrational frequency. Attempts at tuning the dampers have used elastomeric masses arranged tightly between the rotating inertia mass and an inside wall of the housing such as disclosed in U.S. Pat. No. 3,552,230; or have located elastomeric masses between the inside wall of the housing and the inertia mass to rotate freely with a viscous fluid interface between the housing, the elastomeric ring and the inertia mass; or have bonded an elastomeric mass to both the inside surface of the housing and the inertia mass such as disclosed in U.S. Pat. No. 3,603,172.

These configurations attempt to tune viscous dampers for torsional vibration but do not address the problem of damping both torsional and lateral vibrations.

SUMMARY OF THE INVENTION

It is an object of the present invention to provide a viscous vibration damper for a rotating shaft such as a crankshaft, which permits damping of both lateral and torsional vibration of the shaft without cross-coupling. It is an object that the damping characteristics in one direction (e.g., torsionally) can be made to be unique from the damping characteristics in the other direction (e.g., laterally). It is an object of the invention to permit a viscous vibration damper to be independently optimized for both torsional and lateral vibration modes using the same inertia mass. It is an object to overcome the drawbacks of the prior art wherein dual-mode dampers are typically elastomeric-tuned absorbers and which utilize two inertia masses, yet incur cross-coupling, which can induce additional vibration modes.

The present invention provides a dual mode viscous crankshaft vibration damper which works on a same principal as a viscous torsional vibration damper, but also has the capability to dampen lateral vibrations from the crankshaft. Torsionally, the dual mode viscous damper is untuned, damping across the entire engine speed range, all frequencies and all orders. Laterally, the dual mode damper relies on a damping medium placed between the inertia rings and the housing. Teflon strip bearings are incorporated into the design to tighten the inner shear gap considerably. The Teflon bearings allow the inertia ring to spin freely with respect to the housing, and couples the inertia ring to the housing for lateral vibration. This coupling effect permits the lateral vibration damping to take place. The lateral damping medium (elastomeric strip, springs, or O-rings) is a spring element that absorbs the lateral vibration induced by the shaft, such as a crankshaft of an internal combustion engine, but does not effect the torsional damping capability of the unit.

Although Teflon is an exemplary material to use for the reduced friction bearing, other low friction bearing material can be used depending on the application and environment.

The present invention provides a first inertia ring having applied thereto a low friction bearing, such as a Teflon bearing, on an inside diameter, and which tightly surrounds an inside surface of the working chamber of the housing; and a surrounding second inertia ring having lateral damping elements arranged between the second inertia ring and the first inertia ring to tightly laterally couple the first and second inertia rings. The first inertia ring, the second inertia ring and the damping elements are preloaded to tightly interengage and operate in concert torsionally but allow lateral vibration to be damped.

DETAILED DESCRIPTION OF THE PREFERRED EMBODIMENTS

Figure 1:
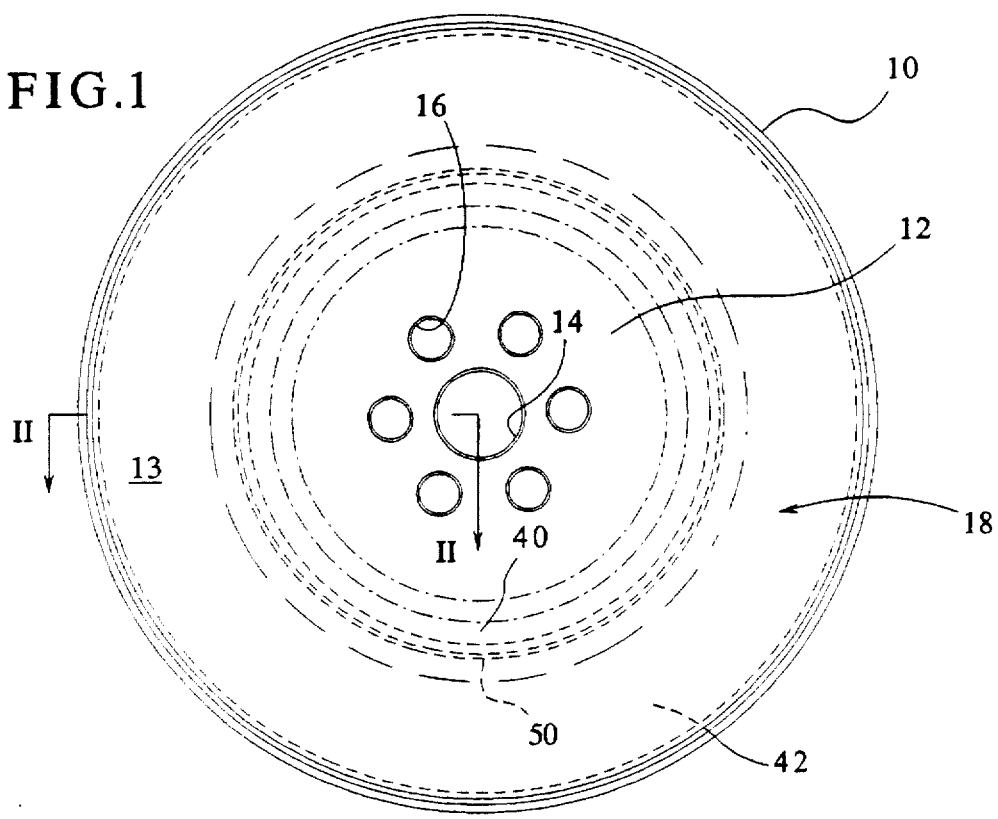
FIG. 1 is an elevational view of a viscous torsional damper according to the invention.

FIG. 1 illustrates a torsional vibration damper 10 of the present invention. The damper includes a hub 12 having a centering aperture 14 and a plurality of bolt holes 16 for attaching the damper 10 to a rotating shaft. Formed around an outer perimeter of the hub 12 is a working chamber 18 described in more detail in FIG. 2.

Figure 2:
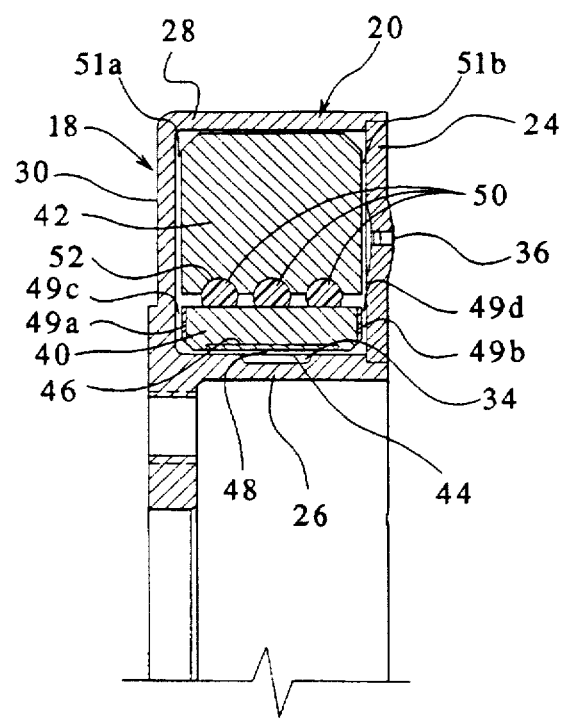
FIG. 2 is a sectional view of the damper of FIG. 1 taken generally along line II—II.

FIG. 2 shows the working chamber 18 comprising a C-shaped perimeter 20 closed by a planar, annular cover 24. The C-shaped chamber includes an inside annular wall 26, an outside annular wall 28 and a back annular wall 30. On the inside surface of the inside annular wall 26 is a dished area 34 for holding a limited supply of viscous fluid, acting as a reservoir. A tapped fill port 36 is provided in the cover 24 to fill the chamber 18 with viscous fluid. Within the chamber 18 is located a first inertia ring 40 and a second inertia ring 42 arranged coaxially. The first inertia ring 40 holds a low friction bearing 44 (such as Teflon) within a recess 46. The bearing 44 faces the inside surface of the inside wall 26 to provide a reduced friction sliding between the first inertia mass 40 and the wall 26. The use of the low friction bearing allows a much reduced gap 48 between the bearing 44 and the wall 26, reduced by more than 60% of typical inner diameter guided inertia rings. The first inertia ring 40 has coatings 49a, 49b on its axial surface to act as a smooth friction reduced surface between the ring 40, the wall 30 and the cover 24. This coating can be a nylon coating.

Between the first and second inertia rings 40, 42 is arranged a plurality of lateral damping elements 50 which tightly couple the first and second inertia masses. In FIG. 2 these elements 50 are elastomeric rings. The second inertia mass 42 include grooves 52 for holding the rings in place. The first and second inertia rings 40, 42 and the elements 50 can be preloaded to act in concert torsionally, by friction.

Axial gaps 49c, 49d between the wall 30 and the ring 40, and the cover 24 and the ring 40 are small and limit the axial movement of the first ring 40 and the second ring 42 coupled thereto by the elements 50. The axial gaps 51a, 51b at the second ring are larger.

Accordance with the embodiment of FIG. 2. the elastomeric elements 50 are in the form of O-rings. However, the invention also encompasses intermittently applied springs such as elastomeric plates, mechanical springs, a single elastomeric annular pad, or other means to closely mechanically couple the first and second inertia mass to achieve lateral vibration damping. The bearing 44 allows free spinning of the first and second inertia masses with the lateral damping elements so that the inertia masses together remain untuned to dampen across the entire vibration spectrum. However, the presence of the elastomeric elements allow for lateral vibration damping because of the close mechanical coupling between the inside wall 26 of the working chamber 18 and the first inertia ring 40 and the tight mechanical coupling between the first inertia mass 40 and the second inertia ring 42 by the damping elements 50. Viscous fluid filled through the port 36 surrounds the first and second inertia masses.

Figure 3:
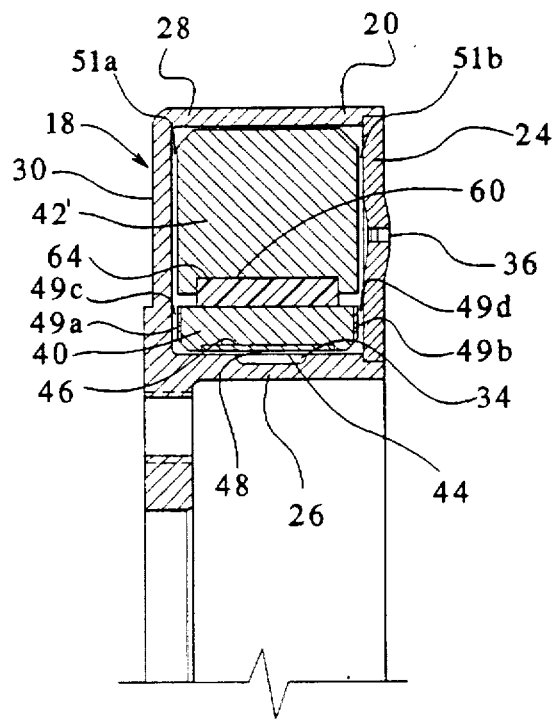
FIG. 3 is a sectional view of an alternate embodiment damper.

FIG. 3 illustrates an alternate embodiment of the damper wherein the elastomeric elements 50 have been replaced with a single elastomeric pad 60 which can be a complete ring or intermittent tabular pads. The pad 60 can be held in a recess or recesses 64 in a second inertia ring 42'.

Figure 4:
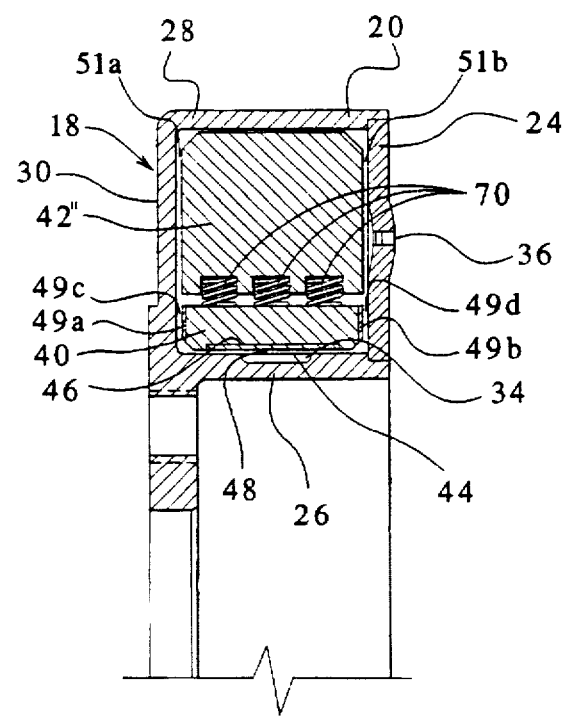
FIG. 4 is a sectional view of a further alternate embodiment damper.

FIG. 4 illustrates a further alternate embodiment wherein the elastomeric elements 50 of FIG. 2 have been replaced by coil springs 70, which can be held in recesses 74 in a second inertia ring 42". Alternatively, the coil springs could be leaf springs or another type of mechanical resilient element.

Although the present invention has been described with reference to a specific embodiment, those of skill in the art will recognize that changes may be made thereto without departing from the scope and spirit of the invention as set forth in the appended claims.

We claim as our invention:

1. A viscous torsion damper comprising:
   a central hub;
   an annular chamber surrounding and connected to said central hub;
   a first annular inertia mass closely coupled for lateral vibration to an inside annular surface of said annular chamber;
   a second annular inertia mass arranged entirely radially outward from and concentric of said first annular inertia mass and defining a gap therebetween;
   said first and second inertia masses moveable relative to said central hub within said annular chamber defining one or more shear planes therebetween;
   a resilient damping element arranged within said gap mechanically coupling said first and second inertia masses via friction for damping lateral vibration, said resilient damping element spaced from said one or more shear planes; and
   a viscous fluid disposed at least between said second inertia mass and an inside surface of said annular chamber.

2. The damper according to claim 1, wherein said annular chamber has a rectangular cross section with an inside annular wall providing said inside annular surface, an outside annular wall, an upstanding back annular wall and an upstanding annular cover, wherein said first inertia mass closely surrounds said inside annular wall with a friction reducing bearing between said first inertia mass and said inside annular wall.

3. The damper according to claim 2, wherein said inside wall comprises a dished area for holding a supply of fluid therein.

4. The damper according to claim 1, wherein said damping element comprises a plurality of elastomeric O-rings arranged in said gap between said first and second inertia masses, said second inertia mass providing annular grooves on a facing surface toward said first inertia mass for receiving a portion of said elastomeric O-rings therein.

5. The damper according to claim 1, wherein said damping element comprises a spring element.

6. The damper according to claim 1, wherein said damping element comprises elastomeric O-rings surrounding said first inertia mass.

7. The damper according to claim 1, wherein said damping element comprises an annular elastomeric element surrounding said first inertia mass.

8. The damper according to claim 1, wherein said damping element comprises discrete resilient elements spaced around a circumference of said first inertia mass.

9. The damper according to claim 1, wherein said annular chamber has a rectangular cross section with an inside annular wall providing said inside annular surface, an outside annular wall, an upstanding back annular wall and an upstanding annular cover, wherein said first inertia mass closely surrounds said inside annular wall with a friction reducing bearing between said first inertia mass and said inside annular wall; and said damping element comprises at least one annular elastomeric element surrounding said first inertia mass.

10. The damper according to claim 9, wherein said at least one annular elastomeric element comprises a plurality of O-rings arranged concentrically.

11. The damper according to claim 1, wherein said damping element comprises an annular elastomeric element surrounding said first inertia mass and sized having a radial thickness to tightly couple said first and second inertia masses.

12. A viscous torsion damper comprising:
    a central hub;
    an annular working chamber surrounding and connected to said central hub;
    a first annular inertia mass closely coupled for lateral vibration to an inside annular surface of said working chamber, said first annular inertia mass having a friction reducing bearing surface against said inside annular surface of said working chamber;
    a second annular inertia mass arranged entirely radially outward from and concentric of said first annular inertia mass and defining a gap therebetween;
    said first and second inertia masses moveable relative to said central hub within said annular chamber defining one or more shear planes therebetween;
    a resilient damping element arranged within said gap mechanically coupling said first and second inertia masses via friction for damping lateral vibration, said resilient damping element spaced from said one or more shear planes; and
    a viscous fluid disposed at least between said second inertia mass and an inside surface of said working chamber.

13. The damper according to claim 12, wherein said working chamber comprises an annular chamber having a rectangular cross section with an inside annular wall providing said inside annular surface, an outside annular wall, a back annular wall and an annular cover.

14. The damper according to claim 13, wherein said inside wall comprises a dished area beneath said bearing surface.

15. The damper according to claim 12, wherein said damping element comprises a plurality of elastomeric O-rings arranged within said gap between said first and second inertia masses, said second inertia mass providing annular grooves on a facing surface toward said first inertia mass for receiving a portion of said elastomeric O-rings therein.

16. The damper according to claim 12, wherein said damping element comprises a coiled spring element.

17. The damper according to claim 12, wherein said damping element comprises elastomeric O-rings surrounding said first inertia mass.

18. The damper according to claim 12, wherein said damping element comprises an annular elastomeric element surrounding said first inertia mass.

19. The damper according to claim 12, wherein said damping element comprises discrete resilient elements spaced around a circumference of said first inertia mass.

* * * * *